(12) United States Patent
Tibbe

(10) Patent No.: US 12,161,255 B2
(45) Date of Patent: Dec. 10, 2024

(54) MIXING APPARATUS

(71) Applicant: VERSUNI HOLDING B.V., Eindhoven (NL)

(72) Inventor: Tim Gerard Tibbe, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 0 days.

(21) Appl. No.: 18/269,538

(22) PCT Filed: Dec. 21, 2021

(86) PCT No.: PCT/EP2021/087059
§ 371 (c)(1),
(2) Date: Jun. 23, 2023

(87) PCT Pub. No.: WO2022/136412
PCT Pub. Date: Jun. 30, 2022

(65) Prior Publication Data
US 2023/0389745 A1 Dec. 7, 2023

(30) Foreign Application Priority Data
Dec. 24, 2020 (EP) .................................... 20217182

(51) Int. Cl.
*A47J 31/44* (2006.01)
*B01F 23/235* (2022.01)
(52) U.S. Cl.
CPC ....... *A47J 31/4485* (2013.01); *A47J 31/4489* (2013.01); *A47J 31/4496* (2013.01); *B01F 23/235* (2022.01)

(58) Field of Classification Search
CPC ................ A47J 31/4485; A47J 31/4489; A47J 31/4496; B01F 23/235
See application file for complete search history.

(56) References Cited

U.S. PATENT DOCUMENTS

| | | | |
|---|---|---|---|
| 5,768,981 A * | 6/1998 | Cicchetti | ............... A47J 31/461 99/452 |
| 6,499,389 B1 | 12/2002 | Probst | |
| 2015/0305549 A1* | 10/2015 | Perentes | ............. A47J 31/4496 99/453 |
| 2016/0015206 A1 | 1/2016 | Holten et al. | |
| 2017/0055763 A1* | 3/2017 | Buettiker | ............ A47J 31/4489 |
| 2018/0042290 A1* | 2/2018 | Buhlmann | ............... A47J 31/40 |

(Continued)

FOREIGN PATENT DOCUMENTS

| | | |
|---|---|---|
| CN | 101810439 A | 8/2010 |
| CN | 203802270 U | 9/2014 |
| CN | 108013764 A | 5/2018 |

(Continued)

OTHER PUBLICATIONS

Extended European Search Report issued in connection with corresponding EP Application No. 20217182.3 dated May 11, 2021.

*Primary Examiner* — Reginald Alexander
(74) *Attorney, Agent, or Firm* — Maschoff Brennan

(57) ABSTRACT

The invention provides a mixing apparatus having a first port for receiving milk, a second port for receiving steam, an air intake channel for receiving air, and a mixing chamber for mixing milk, steam and air. A barrier element is provided at an output of the mixing chamber, wherein the barrier element is adjustable to define different degrees of frothing.

16 Claims, 8 Drawing Sheets

(56) References Cited

U.S. PATENT DOCUMENTS

| | | | | |
|---|---|---|---|---|
| 2019/0008313 A1* | 1/2019 | Steiner | ................ | A47J 31/4496 |
| 2022/0167779 A1* | 6/2022 | Klepzig | .............. | A47J 31/4485 |

FOREIGN PATENT DOCUMENTS

| | | | |
|---|---|---|---|
| CN | 109247830 | A | 1/2019 |
| CN | 111358299 | A | 7/2020 |
| CN | 111511258 | A | 8/2020 |
| CN | 211795932 | U | 10/2020 |
| DE | 102006043905 | A1 | 4/2008 |
| EP | 3735874 | A1 | 11/2020 |
| WO | 2019129515 | A1 | 7/2019 |
| WO | 2019129599 | A1 | 7/2019 |

* cited by examiner

MIXING APPARATUS

CROSS-REFERENCE TO RELATED APPLICATIONS

The present application is a U.S. National Phase application under 35 U.S.C. § 371 of International Application No. PCT/EP2021/087059, filed on Dec. 21, 2021, which claims the benefit of European Patent Application No. 20217182.3, filed on Dec. 24, 2020. These applications are hereby incorporated by reference herein.

FIELD OF THE INVENTION

This invention relates to the field of automatic beverage preparation, and more specifically to the field of automatic frothed milk beverage preparation.

BACKGROUND OF THE INVENTION

Typically, full automatic espresso appliances provide the function of automated cappuccino brewing. In most cases, steam is used for heating and frothing the milk, in a similar manner to a barista. To improve the ease of use of the appliance and provide stable performance to all users regardless of skill, several milk frothing modules have been developed. Normally, these modules are removable from the base appliance, as all parts in contact with milk need to be cleaned.

The applicant has developed a milk frothing system which comprises only two separable components, which makes it easily cleanable for the user. This design is disclosed in WO 2019/129599 and WO 2019/1029515. This is a pin-less milk frothing system in which the frothing function is driven by the flow of steam. This type of design is less prone to contamination than a traditional design having a pin as an air restriction, and is therefore more robust in froth performance.

The known system generates a single type of frothed milk output, in response to the supply of steam to the system.

US 2016/0015206 discloses a milk frothing device in which an obstacle is provided in the path from a steam inlet into a settling chamber.

DE 10 2006 043 905 discloses a milk foaming device with a rotating foaming element.

It would be desirable to be able to select between at least two possible types of frothed milk output, for example suitable for different drink types.

SUMMARY OF THE INVENTION

The invention is defined by the claims.

According to examples in accordance with an aspect of the invention, there is provided a mixing apparatus comprising:
  a first port for receiving milk;
  a second port for receiving steam;
  an air intake channel for receiving air; and
  a mixing chamber for mixing milk, steam and air to create frothed milk;
  wherein the mixing apparatus further comprises a barrier element at an output of the mixing chamber, wherein the barrier element is adjustable to define different degrees of frothing.

The barrier element is adjustable between at least first and second positions to define the different degrees of frothing. These positions remain static during frothing so that each static position results in a different degree of frothing.

The barrier element influences the liquid level in the mixing chamber and the time spent of the mixture in the mixing chamber before exiting the output of the mixing chamber. It thereby influences the operating characteristics of the mixing apparatus. In particular, it has been found that the adjustable barrier element is able to control the degree of frothing, by which is meant the foam to milk ratio. The mixing chamber functions as a foaming bath in which milk, steam and air are frothed. The barrier element forms a wall of the enclosure which defines the mixing chamber and thereby defines the enclosed volume of the mixing chamber. The barrier may be adjusted between a high (maximum) foam to milk ratio and a minimum foam to milk ratio. This minimum foam to milk ratio may even create foamless hot milk, wherein the degree of frothing is zero or close to zero.

The barrier element does not need to be continuous. In particular, the dynamic e.g. circulating movement of the milk within the mixing chamber means that even a discontinuous barrier may be sufficient to provide the desired barrier function.

The mixing apparatus may further comprise an output spout downstream of the mixing chamber, wherein the barrier element is in the path between the mixing chamber and the output spout.

Thus, the barrier is at the output of the mixing apparatus. This means it is easy to implement an adjustable barrier element, because the barrier element is not buried deep inside the internal structure of the mixing apparatus.

The barrier element for example comprises a lip extending along an entrance to the output spout, and the barrier element is adjustable by rotating the lip. The lip for example has different lip height at different angular positions. The lip may extend along part of the entrance to the output spout. Alternatively, the lip may be an annular lip, extending around the entrance to the output spout.

Thus, a simple rotational adjustment of a lip is used to provide frothing adjustment. This is easy and intuitive for the user.

The lip may have a first lip height and a second, different, lip height at diametrically opposite positions of the lip. Thus, two lip positions 180 degrees apart give two possible frothing characteristics. One of the lip heights may be zero, or they may both be non-zero.

The lip for example has a set of exactly two discrete lip heights. Thus, each lip height extends over nearly 180 degrees, so that accuracy is not needed in setting the lip to a desired one of the two frothing modes.

The lip may instead have at least three discrete lip heights at different angular positions around the lip. Thus, there may be three or more frothing modes.

In another example, the lip has a continuously varying lip height. This allows for more accurate selection of the desired frothing performance.

The barrier element may comprise a notch at a lowest point for each of a set of operational angular positions.

This notch can function as a drain. It is not so large that the function of the barrier element is defeated but it enables emptying of the mixing chamber at the end of use of the mixing apparatus, when the circulating flow in the mixing chamber has ceased. Thus, the barrier element does not need to be a continuous element.

The mixing apparatus may comprise a channel arrangement between the first and second ports and the mixing chamber. The channel arrangement may comprise:

a first channel portion connected between the first port and a frothing section;

a second channel portion connected between the second port and the frothing section, wherein the frothing section couples to the mixing chamber; and an air intake channel to the frothing section.

There is thus a channel arrangement which brings together milk, steam and air to create heated and frothed milk. The frothing is created by the air introduced by the air intake channel and by the mixing in the mixing chamber.

The mixing apparatus may comprise:

a first container, wherein the first container comprises the channel arrangement;

a second container, wherein the second container is adapted to receive the first container; and a seal disposed between the first container and the second container.

This arrangement allows for milk and steam to be provided to the mixing chamber by way of a channel defined at least in part by a seal. In this way, the channel may be disassembled for cleaning by simply removing the first container from the second container as the channel arrangement only comprises these two separable parts.

In addition, as the channel is itself defined in part by the seal when disposed between the first and second containers, the adequate sealing of the channel is ensured. Mounting of the two containers together provides the required seal positioning and/or compression or extension.

The first container may further comprise a raised container portion, and wherein the channel arrangement is defined between the raised container portion and the seal.

In this way, the dimensions of the channel may be controlled by altering the depth of the raised container portion and the cleaning required for the seal is reduced. The seal for example comprises a span seal.

The invention also provides a coffee maker, the coffee maker comprising;

a liquid coffee extraction apparatus;

the mixing apparatus as defined above; and a dispenser adapted to dispense:

liquid coffee from the liquid coffee extraction apparatus; and frothed milk from the mixing apparatus.

BRIEF DESCRIPTION OF THE DRAWINGS

Examples of the invention will now be described in detail with reference to the accompanying drawings, in which.

DETAILED DESCRIPTION OF EMBODIMENTS

The invention provides a mixing apparatus having a first port for receiving milk, a second port for receiving steam, an air intake channel for receiving air, and a mixing chamber for mixing milk, steam and air A barrier element is provided at an output of the mixing chamber, wherein the barrier element is adjustable to define different degrees of frothing.

Figure 1:
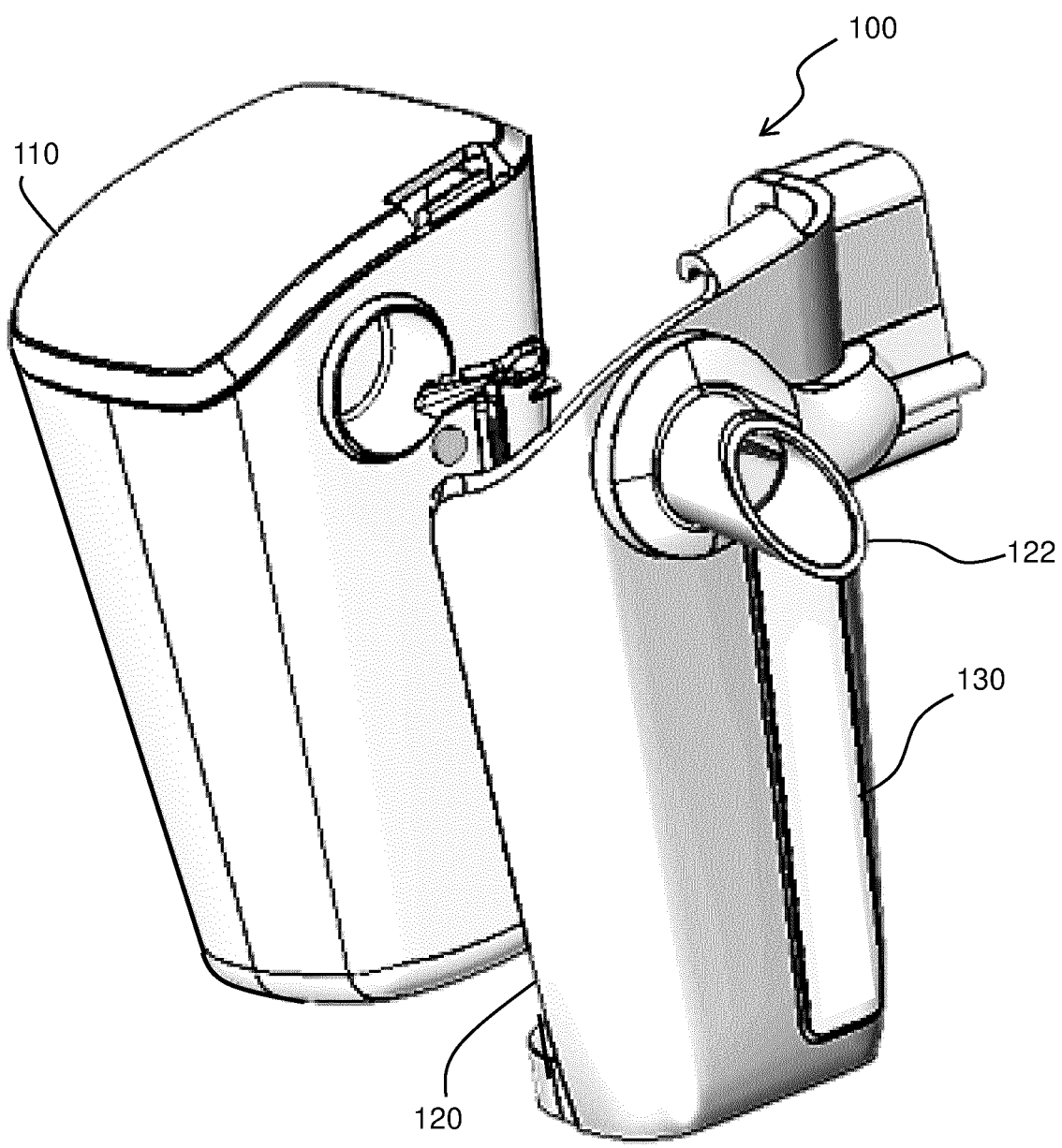
FIG. 1 shows a two-part mixing apparatus.

FIG. 1 shows the mixing apparatus 100, comprising a first container 110 and a second container 120, adapted to receive the first container 110. The second container may surround the first container, or it may only partially surround the first container, as shown. The second container 120 defines an output spout 122 from which frothed milk is provided. The first container may thus fit fully into the second container or else the second container may clip onto the outside of the first container.

A channel arrangement is formed by the interface between the first and second containers, as discussed in more detail below. A seal 130 provides sealing of the channel arrangement. When the first and second containers are separated, the channel arrangement is opened. In the illustrated embodiment, the seal 130 is visible on the outside of the second container 120 because it extends fully through the outer wall of the second container in this example. There is no purpose to the visible outer surface of the seal; rather it is just one aesthetic design option. The inner surface of the seal closes respective channel portions of the channel arrangement.

Figure 2A:
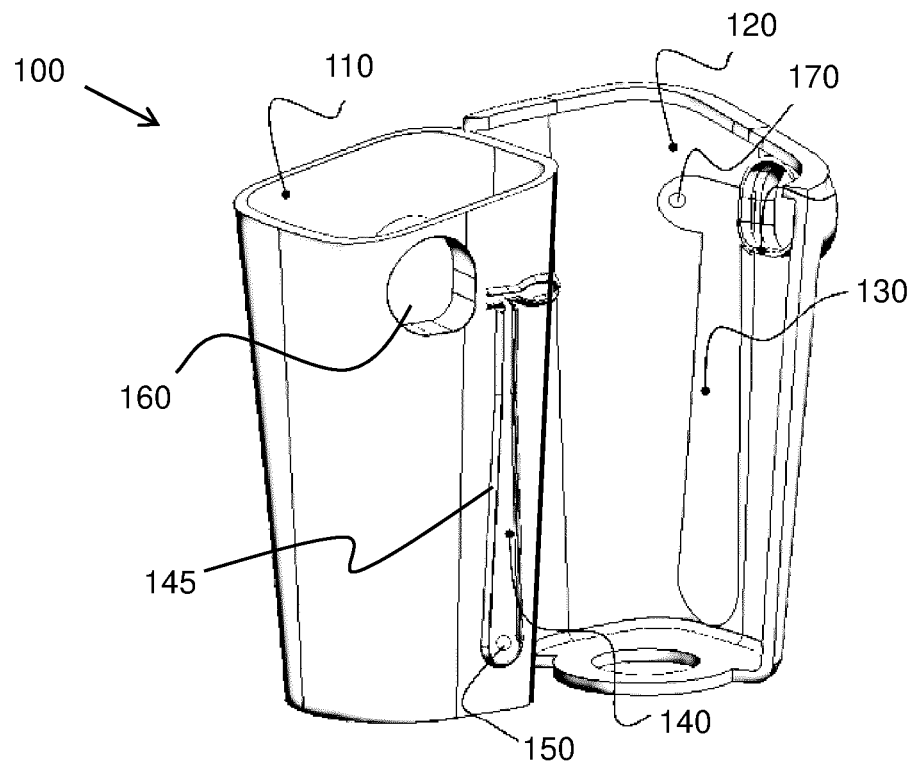
FIG. 2A shows an exploded view in more detail of the mixing apparatus of FIG. 1.

FIG. 2A shows the mixing apparatus 100 in more detail and shows the first container 110, the second container 120, adapted to receive the first container 110, and the seal 130 disposed between the first and second containers.

Instead of being integrated with the container and extending fully through the container wall, the seal may be a press fit into a side wall of one of the two containers so that when the two containers are assembled, the seal is sandwiched between them. In all designs of this general type, the mating between the seal and one of the containers forms a closed channel arrangement which may define the fluid paths for mixing a milk inlet, a steam inlet and provide a frothed milk output. By separating the two containers all parts can be easily cleaned. Preferably, there is only one seal element for sealing the entire channel arrangement used for the supply and mixing of milk and steam.

The seal may be 2 shot (2K) molded into the second container 120, or else it may be a separate seal which is removable from a recess in the second container.

The channel arrangement 140 may be provided in the first container 110, and together with the seal 130 define a closed channel when the mixing apparatus is assembled. In the example shown in FIG. 2A, the first container 110 comprises a raised channel portion 145, which further defines the channel arrangement 140. The channel arrangement 140 connects a first port 150 near a bottom of the first container and a mixing chamber 160 near a top of the first container. The second container comprises a steam entry port (indicated with reference numeral 175 in FIG. 2B) connected to a second port 170 provided in the seal 130. The channel arrangement 140 further connects the second port 170 to the first port 150 and the mixing chamber.

Figure 2B:
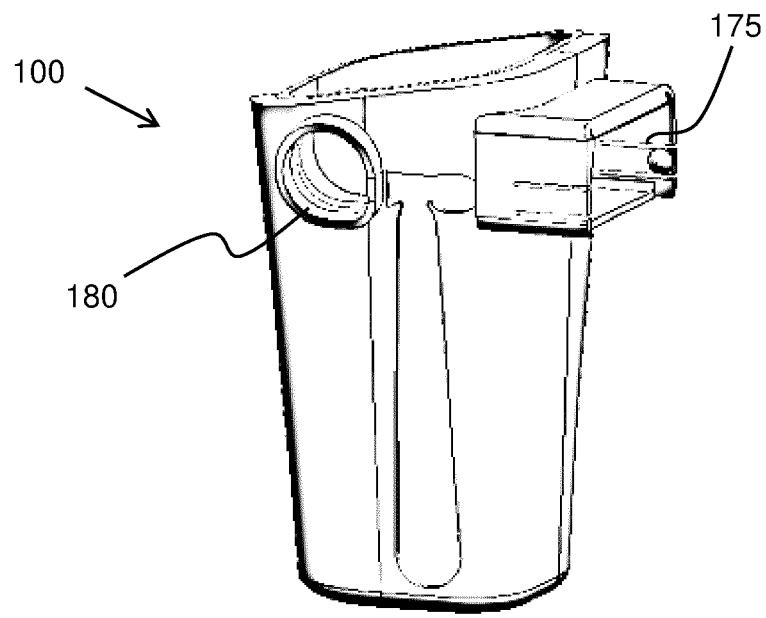
FIG. 2B shows an assembled view of the mixing apparatus of FIG. 2A.

FIG. 2B shows the mixing apparatus 100 of FIG. 1A in an assembled state.

In this Figure, it can be clearly seen that the second container 120 comprises a steam entry port 175 from which steam may be provided to the second port 170. The second container 120 further comprises a third port 180 that in assembled condition is connected to the mixing chamber 160 of the first container, thereby allowing the contents of the mixing chamber to be easily obtained from the mixing apparatus. The third port 180 leads to the output spout 122 (not shown in FIG. 2A or 2B, but seen in FIG. 1). The operation of the mixing apparatus is described with reference to FIG. 3A below.

Figure 3A:
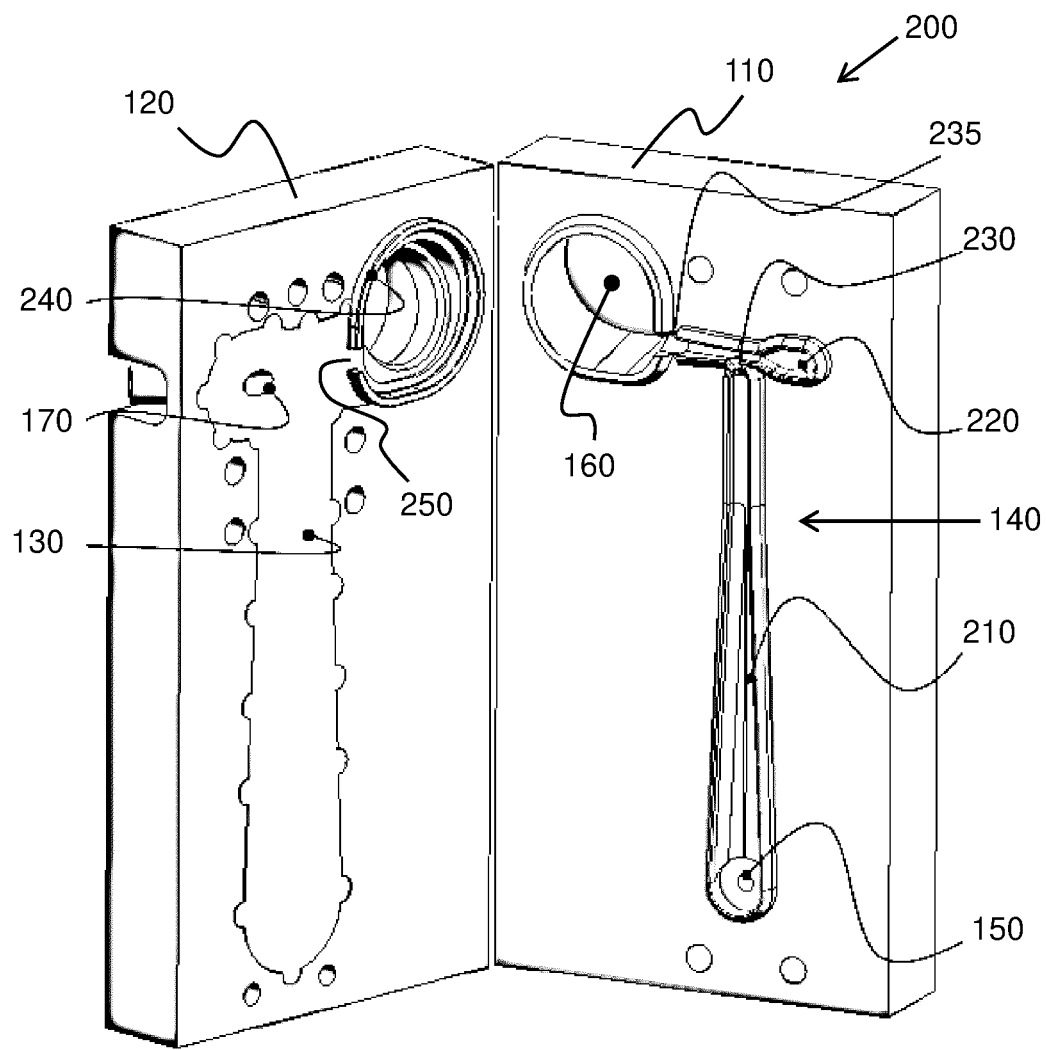
FIG. 3A shows a detailed view of the channel of the mixing apparatus of FIG. 2A.
Figure 3B:
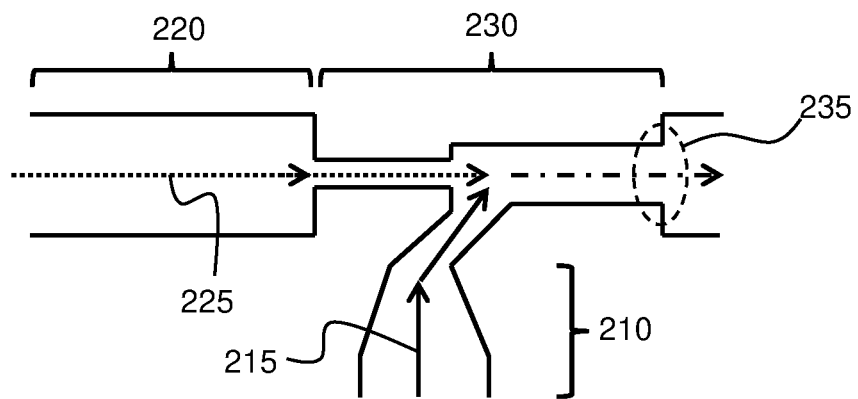
FIG. 3B shows the flow of fluid through the channel of FIG. 3A.

FIG. 3A shows a detailed view 200 of the channel arrangement 140 of the mixing apparatus of FIG. 2A. FIG. 3B shows a simple illustration of the intersection of the various portions of the channel arrangement 140.

The channel arrangement 140 may be divided into several portions according to the operation performed by each portion. In operation, milk may be provided to the first container 110 and steam may be provided to the steam entry port 175 of the second container. As steam enters the channel arrangement 140 by way of the second port 170, milk 215 is drawn from the first container 110 into a first channel portion 210 by way of the first port 150. The steam 225 enters a second channel portion 220 and travels through a third channel portion 230 (hereinafter also referred to as frothing section) and into the mixing chamber 160. The flow of steam generates a reduced pressure (compared to the ambient pressure) in the third channel portion 230, thereby drawing in the milk 215 along the first channel portion 210. The steam is further used to heat the milk and mix the milk with air to create milk froth and thus forms the driving force of the overall frothing system.

The milk 215 is drawn along the first channel portion 210 until it meets the flow of steam 225 at the intersection of channel portions 210 and 230. This intersection may be at a central part of the third channel portion 230, just downstream of a throat formed between the second channel portion 220 and the start of the third channel portion 230. At this throat, the steam is accelerated substantially, thereby imparting a Venturi effect (a reduction in fluid pressure that results from the constriction of the throat) on the steam as it passes into the third channel portion 230.

The static absolute steam pressure (which in the given example may for instance be approximately 1.9 bar=190 kPa) is thereby transferred into a dynamic pressure (velocity). The milk is sucked in by the resulting pressure reduction. The steam velocity is highest at the end of the throat, i.e. where the first channel portion 210 intersects the third channel portion 230. The second part of the third channel portion 230, i.e. the portion downstream of the throat and aforementioned intersection may be considered to function as a diffuser, in which the velocity of the milk and steam mixture slows down, transferring dynamic pressure back into static pressure.

The third channel portion 230 terminates at an end 235 which opens into the mixing chamber 160. An air intake channel 725 is formed at the end 235, just upstream of the mixing chamber, via which air is introduced in the milk/steam mixture. The flow speed of the milk/steam mixture near the air intake channel is such that the static pressure is still below ambient pressure, so that air is drawn in and leakage of milk/steam mixture is prevented. The introduced air provides bubbles for the desired frothing.

In the mixing chamber 160, the mixture of milk, steam and air reaches ambient static pressure and the velocity component or dynamic pressure returns to zero. Thus, the steam experiences a Venturi effect in the throat. This is the master (active) effect, driving the milk flow as a slave (passive) effect. This Venturi effect in the third channel portion 230 may be achieved by simply restricting the cross sectional area of the third channel portion 230 relative to the second channel portion 220. The flow of the milk and steam in the third channel portion, in combination with the drawing in of air, defines the frothing performance of the mixing apparatus, and the pressure differentials prevent the milk and steam from flowing down the incorrect channels. The third channel portion may thus be considered to be a frothing section. In particular, the geometries of the channels determine the ratios between steam, milk and air, and these ingredients are combined in the third channel portion.

The mixing chamber froths these ingredients to create the frothed milk, and it also expels excess air. The mixing chamber 160 is thus the location where the actual frothing takes place. The frothing performance depends on the mixing chamber geometry.

The first channel portion may typically be vertical in use and extend up from the (milk entry) first port 150. At the top it may meet the second channel portion 220 to one side which has the steam entry port 175 at its remote end, and the third channel portion 230 to the other side, which has the mixing chamber 160 at its remote end. In the illustrated embodiments, the channel arrangement 140 thus has a T-shape, and the seal 130 has a corresponding T-shape.

Figure 4:
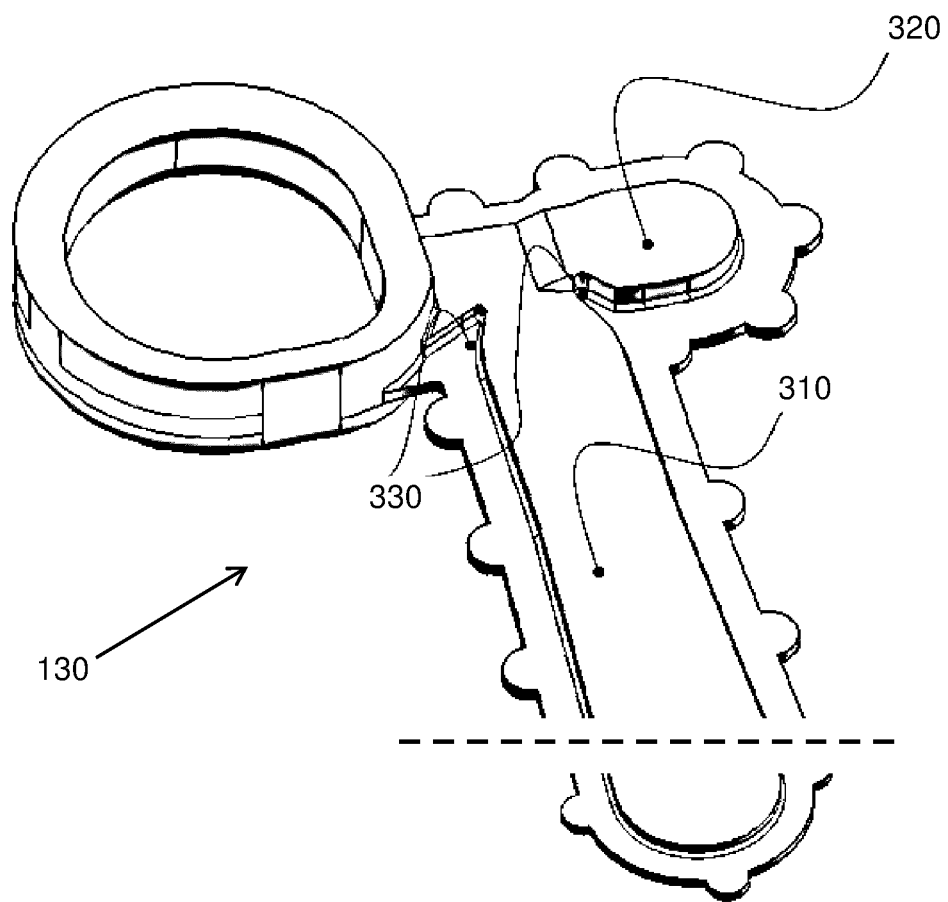
FIG. 4 shows an example of a span seal.

FIG. 4 shows the seal 130 of FIG. 3A in more detail.

It is clear from the description above that the various channel portions 210, 220, 230 may undergo a variety of different conditions when the mixing apparatus 100 is in operation. Therefore, the respective seal areas of these channel portions may each have their own seal requirements or specifications. The seal areas may be integrated in a single seal, for instance a span seal, as illustrated. The specifications of the respective seal areas can easily be optimized, e.g. by locally varying the thickness of the seal. By integrating the different seal areas in a single seal, there is no risk of leakage at the transition between the various areas.

As explained above, air is drawn in via the air intake channel 725 at the end 235 of the third channel portion 230 so that there is a milk, steam and air mixture entering the mixing chamber 160. The aim of the mixing chamber is to release large bubbles and retain only small air bubbles in the mixture. The air, milk and steam mixture forms the fluid that enters the mixing chamber.

The frothing process involves the division of a bulk air flow into smaller and smaller bubbles, until the moment where the bubbles are encapsulated into the fluid, and there is then a slushy mixture of air and milk. In principle, the more time the jet of steam, air and milk has to break down the air, the more silky the froth becomes.

Without the barrier, some large bubbles and bulk air will flow out. However, these bubbles are not stabilized by the fluid, and the proteins inside milk, so they float on top of the hot milk and implode very quickly. Thus, they do not contribute to creating a silky milk froth.

The speed of the liquid (milk, steam and air) entering the mixing chamber is important for the foam quality. The air enters at the end 235 of the third channel portion 230 and there is a hole leading to the outside air, for example with a minimum hole size such as formed by a 1.5 mm gap. The distance between the milk Venturi and the air gap, and the distance between the air gap and the mixing chamber are parameters for defining the milk frothing characteristics.

To the extent described above, the mixing apparatus is known, and indeed FIGS. 2 to 4 are taken from WO 2019/129599 and WO 2019/1029515.

This invention relates to controlling the degree of frothing, i.e. the foam to milk ratio in the liquid delivered by the output spout 122, and in particular in a way which can be controlled by the user.

Figure 5:
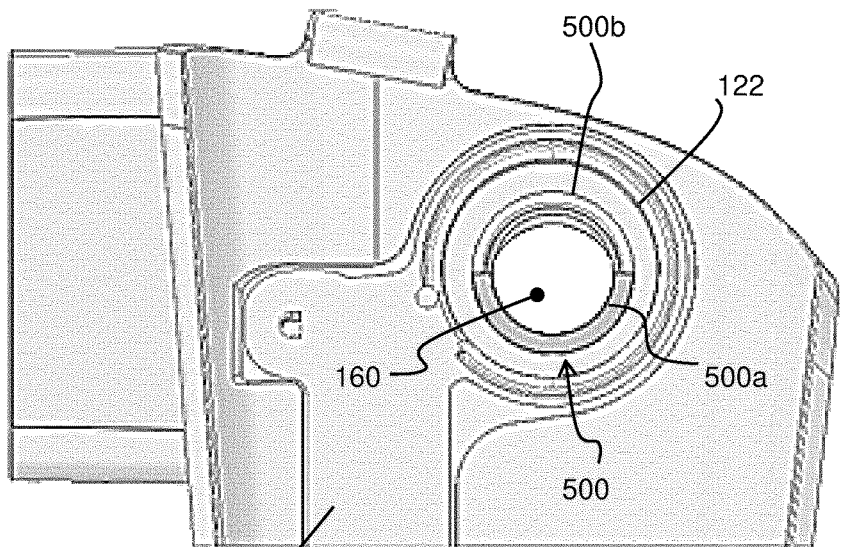
FIG. 5 shows a mixing apparatus in accordance with the invention, in a first mode of operation.

FIG. 5 shows a mixing apparatus in accordance with the invention, in a first mode of operation. FIG. 5 is a view looking into the output spout 122, and hence into the mixing chamber 160.

The mixing apparatus comprises barrier element 500 at an output of the mixing chamber 160, in particular at the junction between the mixing chamber 160 and the output spout 122.

The barrier element 500 impedes the exit of the mixed fluid from the mixing chamber, and thereby influences the mixing function and thereby influences the frothing characteristics of the mixing chamber.

The barrier element creates a back pressure, and thereby changes the flow characteristics, and also shifts the balance of the ingredients.

In the example shown, the barrier element 500 comprises an annular lip extending around an entrance from the mixing chamber 160 to the output spout 122. The annular lip for example has different lip height at different angular positions.

In the example of FIG. 5, the barrier element 500 has a 180 degree section 500a of larger lip height and a 180 degree section 500b of lower lip height. The lip "height" is the amount by which the lip extends radially inwardly from the inner surface of the output spout 122.

The output spout diameter is for example approximately 20 mm, and the difference in lip height may for instance be in the range 1 mm to 3 mm.

In this example, the larger lip height is for example 2 mm and the lower lip height is zero. This will become clearer with reference to FIG. 7.

In the configuration shown in FIG. 5, the section 500a with larger lip height is arranged at the bottom of the output spout. The lip in this configuration triggers the foaming function.

Figure 6:
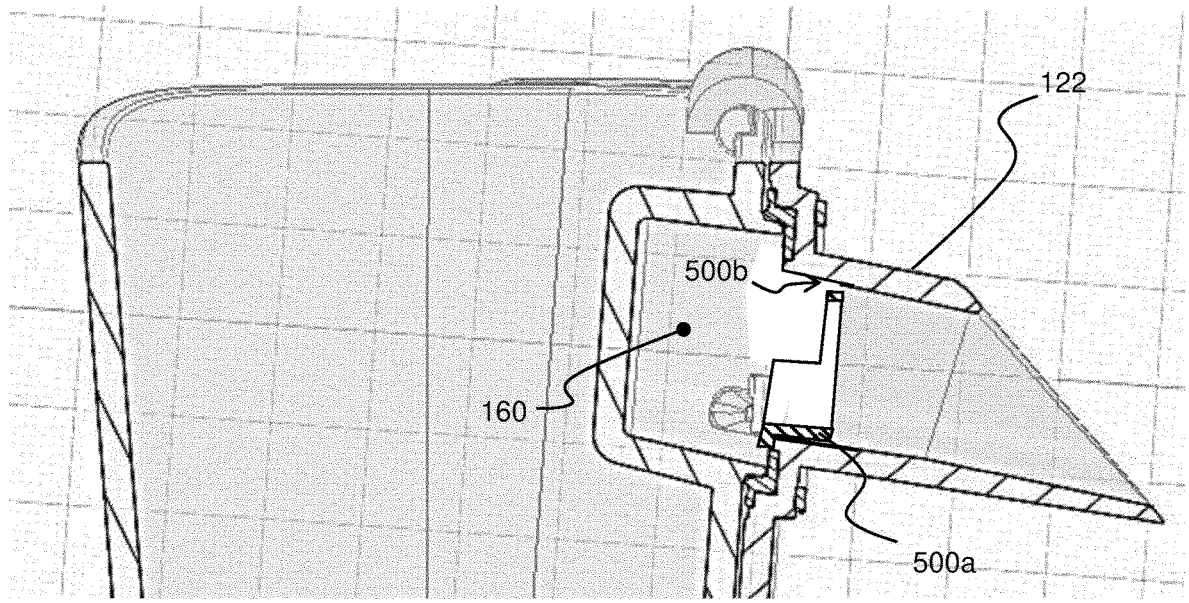
FIG. 6 shows the mixing apparatus of FIG. 5 in cross section.

FIG. 6 shows the mixing apparatus of FIG. 5 in cross section. It shows the lip section 500a forming a barrier preventing the flow from the mixing chamber 160 to the output spout 122 until a raised liquid level is reached in the mixing chamber.

Figure 7:
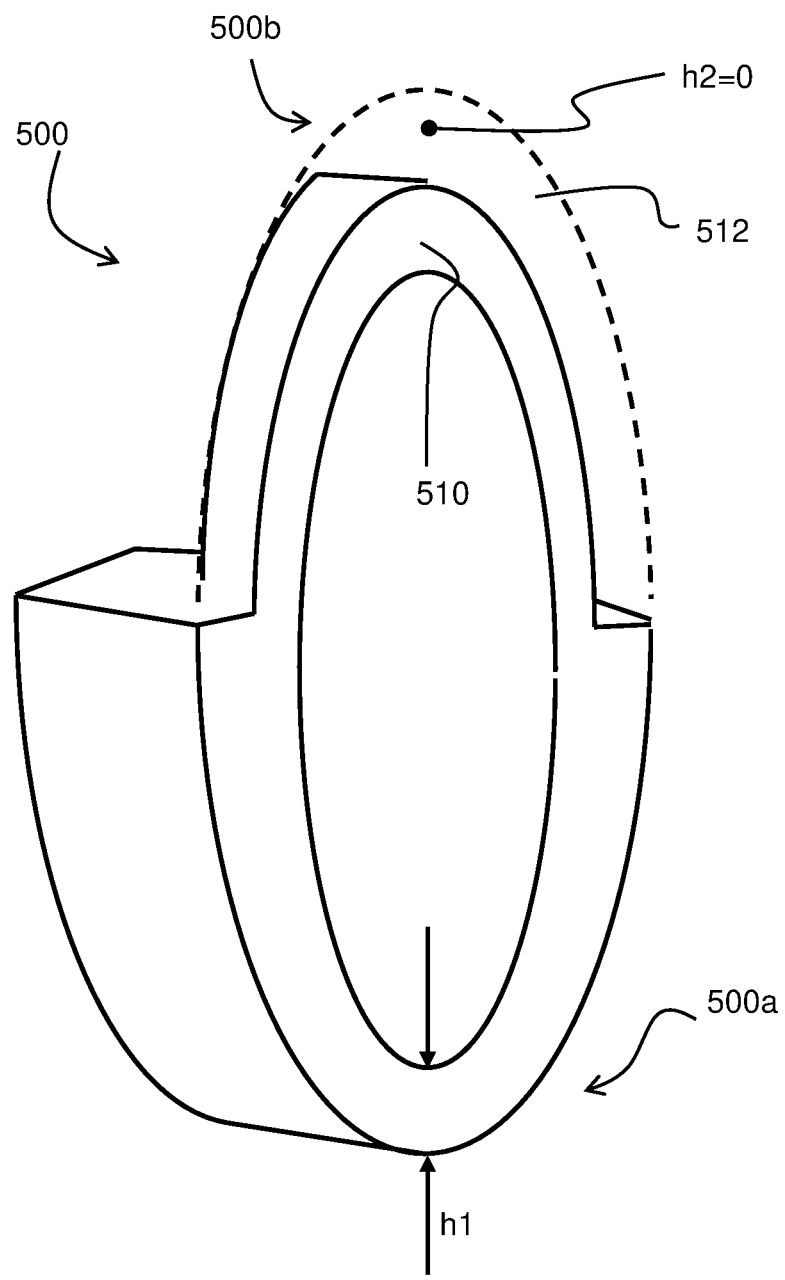
FIG. 7 shows the design of the barrier element used in the mixing apparatus of FIG. 5 in more detail.

FIG. 7 shows an example of the design of the lip 500. In this example, the lip is an annular lip, having a ring 510, with a first lip section 500a with a lip height hi, and a second lip section 500b with a lip height of zero. The ring 510 provides structural rigidity and does not influence flow, because (when the second lip section 500b is arranged at the bottom of the output spout 122) the liquid level does not reach the ring 510; instead the liquid flow passes through the gap 512 (formed between ring 510 and output spout 122. In an alternative embodiments, the lip 500 may include the first lip section 500a only, which may be rotated between a position near the bottom of the output spout 122 (as shown in FIG. 7), or a position near the top of the output spout 122 (not shown). Of course, other designs of the lip are also possible.

Figure 8:
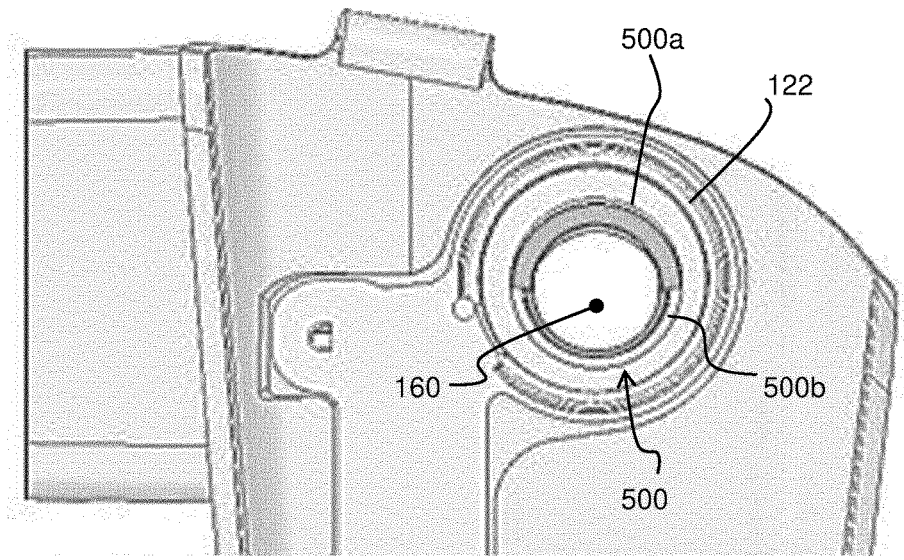
FIG. 8 shows a mixing apparatus in accordance with the invention, in a second mode of operation.

FIG. 8 shows the mixing apparatus with the second lip portion 500b at the bottom. This second lip portion has zero height, as explained with reference to FIG. 7.

Thus, FIG. 5 shows the barrier element in a first static position and FIG. 8 shwos the barrier element in a second static position. The positions are "static" in the sense that the barrier element does not move during the mixing, and it remains in its current position corresponding to the selected frothing characteristics.

The second static position may correspond to a reduced amount of froth (or foam) or indeed a hot milk only mode with no frothing. The lip now presents no barrier to flow from the mixing chamber to the output spout. The liquid level does not reach the ring 510 as explained above.

Figure 9:
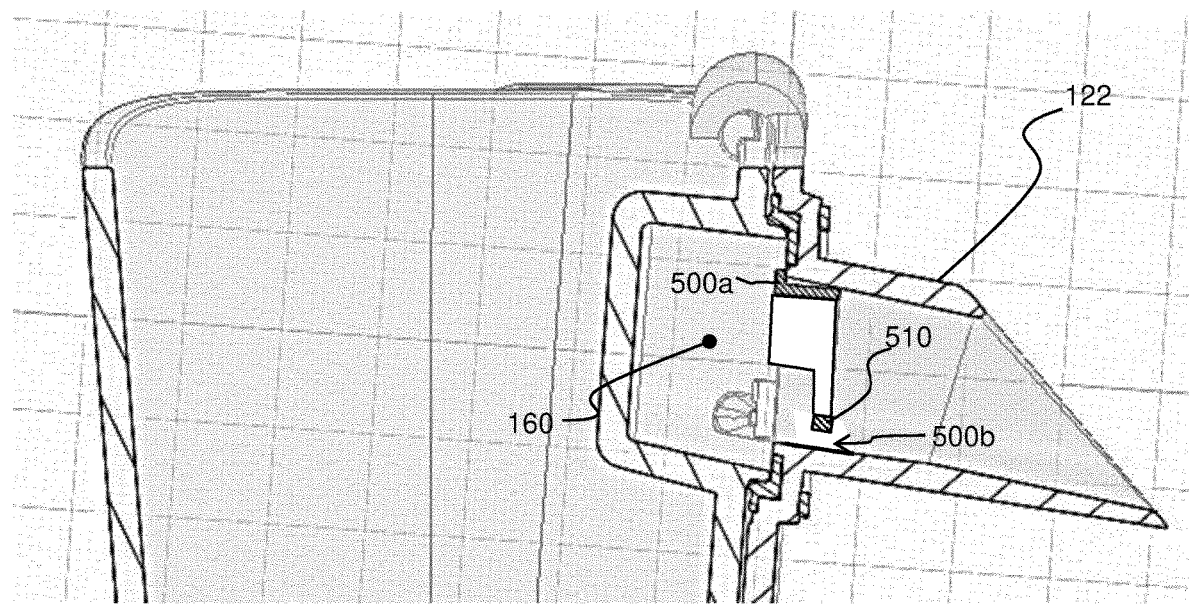
FIG. 9 shows the mixing apparatus of FIG. 8 in cross section.

FIG. 9 shows the mixing apparatus of FIG. 8 in cross section. There may instead be some support for the bottom side of the ring.

Thus, a simple rotational adjustment of the lip, between at least first and second positions, is used to provide frothing adjustment. This is easy and intuitive for the user.

In this example, the lip is an annular lip, having a set of exactly two discrete lip heights, one of which is zero. However, there may be two or more different non-zero lip heights. There may be no zero lip height setting. There may even be a continuously varying lip height. This allows for more accurate selection of the desired frothing performance.

The barrier element 500 influences the liquid level in the mixing chamber and the time spent of the mixture in the mixing chamber before exiting the output of the mixing chamber. It thereby influences the operating characteristics of the mixing apparatus. The mixing chamber functions as a foaming bath in which the milk, steam and air are frothed as explained above. The barrier element forms an adjustable wall of the enclosure which defines the mixing chamber and thereby defines the enclosed volume of the mixing chamber.

The barrier element (in a non-zero height setting) may prevent complete emptying of the mixing chamber. However, a notch or drain channel (not shown) may be provided at the intended lowest point to function as a drain. It is not so large that the function of the barrier element is defeated, because there is a dynamic flow within the mixing chamber, but it enables emptying of the mixing chamber at the end of use of the mixing apparatus, when the circulating flow in the mixing chamber has ceased. Thus, the barrier element does not need to be a continuous element.

Figure 10:
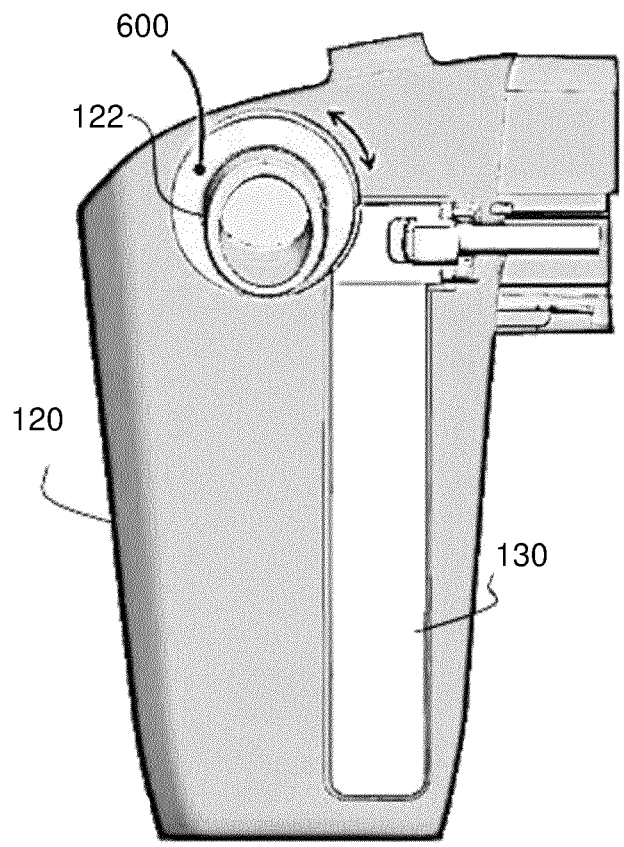
FIG. 10 shows the mixing apparatus of FIGS. 5 to 9 to show how the adjustment between the modes of operation is made.

FIG. 10 shows the mixing apparatus of FIGS. 5 to 9 to show one example how the adjustment between the modes of operation can be made. In the illustrated example, the lip is rotated by an external control ring 600 around the output spout 122. In alternative embodiments, the barrier element 500 may be provided with a handle that can be accessed by a user, for rotating the barrier element 500. In an alternative embodiment, the barrier element 500 may be rotated via a gear transmission.

The invention has been described in connection with one particular two-part design of a mixing apparatus. However, the invention may be applied more generally to any milk frothing apparatus having a mixing chamber where steam, milk and air are mixed. The invention involves providing an adjustable barrier element at the output of the mixing chamber to adjust the frothing performance.

An annular ring is only one possible example. For example, the barrier element may be implemented as an insert or a set of inserts with different radial heights, and the user can select which insert to use in dependence on the frothing characteristics he desires. Thus, selecting one of a set of possible barrier elements is intended to be included within the scope of adjusting the barrier element.

The barrier element may be adjusted by sliding e.g. vertically instead of rotating. The barrier element may be adjusted manually or via motorized means. Thus, many ways of implementing an adjustable barrier element at the exit of the mixing chamber and/or entrance to the output spout will be apparent to those skilled in the art.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A mixing apparatus comprising:
a first port to receive milk;
a second port to receive steam;
an air intake channel to receive air;
a mixing chamber, wherein the steam is used to generate a reduced pressure compared to an ambient pressure, thereby drawing in the milk, heat the milk, and mix the milk with the air in the mixing chamber to create frothed milk;
a barrier element at an output of the mixing chamber, wherein the barrier element comprises a lip extending along an output of the mixing chamber or an entrance to an output spout, wherein the barrier element is adjustable by rotating the lip between at least first and second positions to define different degrees of frothing.

2. The mixing apparatus of claim 1, wherein the output spout is downstream of the mixing chamber, and wherein the barrier element is in a path between the mixing chamber and the output spout.

3. The mixing apparatus of claim 1, wherein the lip is an annular lip.

4. The mixing apparatus of claim 1, wherein the lip has a different lip height at different angular positions.

5. The mixing apparatus of claim 1, wherein the lip has a first lip height and a second, different, lip height at diametrically opposite positions.

6. The mixing apparatus of claim 4, wherein the lip has at least three discrete lip heights at the different angular positions around the lip.

7. The mixing apparatus of claim 1, wherein the lip has a continuously varying lip height.

8. The mixing apparatus of claim 1, wherein the barrier element comprises a notch at a lowest point for each of a set of operational angular positions.

9. The mixing apparatus of claim 1, further comprising a channel arrangement between the first and second ports and the mixing chamber.

10. The mixing apparatus of claim 9, wherein the channel arrangement comprises:
a first channel portion connected between the first port and a frothing section;
a second channel portion connected between the second port and the frothing section, wherein the frothing section couples to the mixing chamber; and
an air intake channel to the frothing section.

11. The mixing apparatus of claim 9, further comprising:
a first container, wherein the first container comprises the channel arrangement;
a second container, wherein the second container is adapted to receive the first container; and
a seal disposed between the first container and the second container.

12. The mixing apparatus of claim 11, wherein the first container comprises a raised container portion, and wherein the channel arrangement is defined between the raised container portion and the seal.

13. The mixing apparatus of claim 11, wherein the seal comprises a span seal.

14. A coffee maker, the coffee maker comprising;
a liquid coffee extraction apparatus;
the mixing apparatus of claim 1; and
a dispenser adapted to dispense:
liquid coffee from the liquid coffee extraction apparatus; and
the frothed milk from the mixing apparatus.

15. A mixing apparatus, comprising:
a first port to receive milk;
a second port to receive steam;
an air intake channel to receive air;
a mixing chamber, wherein the steam is used to generate a reduced pressure compared to an ambient pressure, thereby drawing in the milk, heat the milk, and mix the milk with the air in the mixing chamber to create frothed milk; and
a barrier element at an output of the mixing chamber, wherein the barrier element is adjustable between at least first and second positions to define different degrees of frothing, and wherein the barrier element comprises a notch at a lowest point for each of a set of operational angular positions.

16. A mixing apparatus, comprising:
a first port to receive milk;
a first channel portion connected between the first port and a frothing section;
a second port to receive steam;
an air intake channel to the frothing section to receive air;
a mixing chamber, wherein the steam is used to generate a reduced pressure compared to an ambient pressure, thereby drawing in the milk, heat the milk, and mix the milk with the air in the mixing chamber to create frothed milk;
a second channel portion connected between the second port and the frothing section, wherein the frothing section couples to the mixing chamber; and
a barrier element at an output of the mixing chamber, wherein the barrier element is adjustable between at least first and second positions to define different degrees of frothing.

* * * * *